United States Patent [19]

Seiler

[11] Patent Number: 4,951,505
[45] Date of Patent: Aug. 28, 1990

[54] BLOCK POSITION SENSOR
[75] Inventor: Dale L. Seiler, Austin, Tex.
[73] Assignee: Cooper Industries, Inc., Houston, Tex.
[21] Appl. No.: 13,858
[22] Filed: Feb. 12, 1987
[51] Int. Cl.⁵ .............................................. E21B 45/00
[52] U.S. Cl. .................................................... 73/151.5
[58] Field of Search ............... 73/151.5, 1 D; 364/571
[56] References Cited
U.S. PATENT DOCUMENTS 2,565,951  8/1951  Crookston et al. ................. 73/151.5
4,419,886 12/1983  Peterson ............................. 73/151.5
4,616,321 10/1986  Chan ................................ 73/151.5 X Primary Examiner—Jerry W. Myracle
Attorney, Agent, or Firm—David A. Rose

[57] ABSTRACT

A block position sensor which is responsive to rotation of a drawworks drum for indicating change in position of a traveling block in a drilling rig is disclosed. The sensor includes elements for providing a first output having a fixed relationship to the rotation of the drum, the sensor having a rotatable component reflecting the output, the first output capable of driving an adjustable drive unit for providing a second output having an adjustable relationship to the rotation of the drum; and sensor elements adapted to detect angular rotation of the rotatable component of the sensor for providing a first output and to provide a signal corresponding to amount of rotation of the rotatable component.

10 Claims, 3 Drawing Sheets

BLOCK POSITION SENSOR

BACKGROUND OF THE INVENTION

1. Field of the Invention

The present invention relates to an apparatus for indicating the change in position of the drawworks drum in a drilling rig, and more particularly, to an apparatus for determining and displaying such drilling related parameters as rate of penetration of bit and traveling block position.

2. Description of the Prior Art

In an oil well drilling rig, a traveling block is suspended from a crown block by means of a cable having one end secured at a suitable location on a derrick and the other end wrapped around a rotatable drumworks drum. A drilling apparatus is coupled to the traveling block and extends into a drill hole. As drilling proceeds, the drawworks drum rotates thus lowering the traveling block. The drilling apparatus coupled thereto penetrates the earth's surface at a rate which is determined by a number of variables. To facilitate control of drilling operations, it is desirable to monitor and record the position of the traveling block, as well as other parameters.

U.S. Pat. No. 4,419,886 to Peterson describes a number of prior art methods of obtaining the desired traveling block position information. Those methods include use of a measuring line directly connected to the traveling block, use of drum rotation measuring systems including electronic means for compensating for various diameters of material wound about a drum, and use of pneumatic devices to measure movement of the traveling block. The descriptions in U.S. Pat.No. 4,419,886 of those prior art methods, as well as the associated descriptions of the shortcomings of each of those prior art methods, are incorporated herein by reference.

SUMMARY OF THE INVENTION

The present invention offers a much improved apparatus for determining and displaying such drilling related parameters as rate of penetration and bit position. The present invention uses either electrical or mechanical signals, or both, in conjunction with appropriate data acquisition systems, such as computers and mechanical recorders, to determine and display various parameters. The apparatus of the present invention, which apparatus is responsive to rotation of a drawworks drum for indicating change in position of a traveling block in a drilling rig, comprises means for providing a first output having a fixed relationship to the rotation of said drum, said means having a rotatable componenT reflecting said output, said first output capable of driving an adjustable drive unit for providing a second output having an adjustable relationship to the rotation of the drum; and sensor means adapted to detect angular rotation of said rotatable component of said means for providing a first output and to provide a signal corresponding to amount of rotation of said rotatable component.

Accordingly, it is an object of this invention to provide an apparatus for determining position and direction and rate of movement, if applicable, of a traveling block of an oil drilling rig.

Another object of this invention is to produce electrical or mechanical signals, or both, for use by appropriate data handling and display systems for determining and displaying various characteristics of drilling operations, such as rate of penetration and bit position.

Yet another object of this invention is to drive a mechanical rate of penetration sensor such as the one disclosed in U.S. Pat. No. 4,419,886 to Peterson.

Still yet another object of the present invention is to sense drawworks drum position, speed and direction in order to supply data for calculation and display by appropriate means of such characteristics of drilling operations as block position, rate of penetration, and depth of hole.

A further object of the present invention is to provide an apparatus capable of providing information suitable for use for other drilling control mechanisms, such as emergency brake systems.

Other objects, advantages, and new features of the invention will become apparent from the following detailed description of the invention when considered in conjunction with the accompanying drawings wherein:

DESCRIPTION OF THE PREFERRED EMBODIMENT

Figure 1:
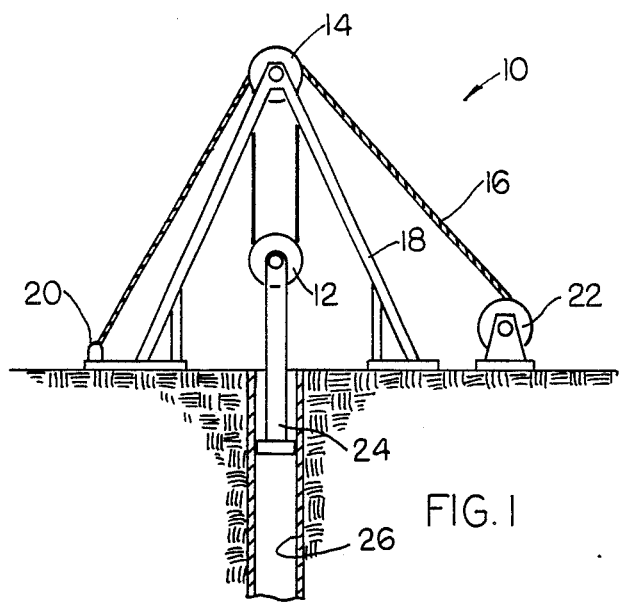
FIG. 1 is a schematic diagram of an oil drilling rig and of a calibration device for use with, or a calibration component of, the apparatus of the present invention.

Referring now to the drawings and, more particularly, to FIG. 1 thereof, there is shown an oil drilling rig, generally designated 10, including a traveling block 12 suspended from a crown block 14 by means of a cable 16. Crown block 14 is supported above the surface of the ground by means of a suitable derrick 18. One end of cable 16 is secured at a suitable location 20 on derrick 18 and the other end of cable 16 is wrapped around a rotatable drum works drum 22. Drum 22 has a plurality of wraps (one rotation of cable 16 around drum 22) and a plurality of layers (a complete set of wraps that fill the drum from flange to flange in a level, even layer). A drilling apparatus 24 is coupled to traveling block 12 and extends into a drill hole 26. Element 60, mounted on the drilling rig floor 62 and connected to traveling block 12 via cable 64 is described and explained in a discussion below of calibration of the sensor of the present invention.

Figure 2:
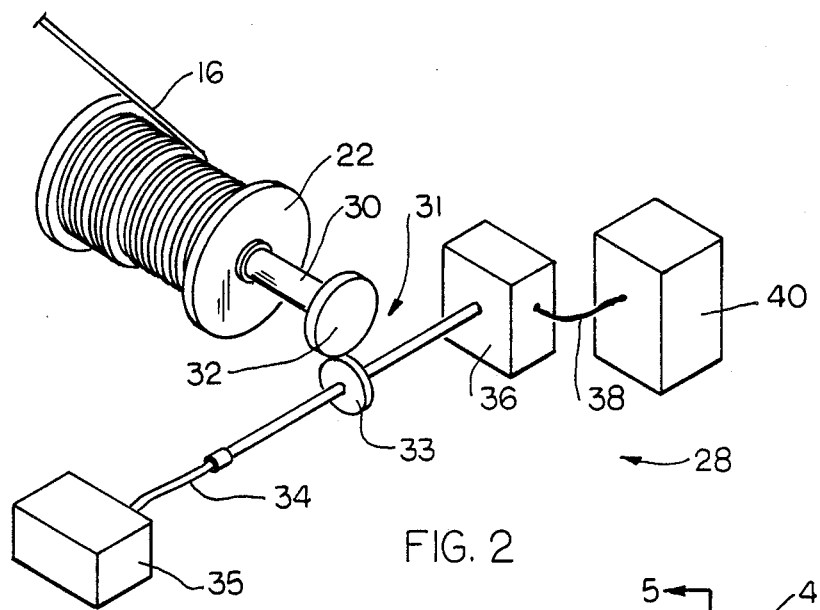
FIG. 2 is a schematic perspective diagram of the apparatus of the present invention.

Referring now to FIG. 2, the present block position sensor, generally designated 28, utilizes the shaft 30 of drum works drum 22 as the primary pickup point. In cases where it may be difficult to use this area, a follower wheel on the flange of drum 22 may be used. On certain drawworks, a follower wheel on the drum clutch may be used. Other pickup points are possible.

For proper operation of sensor 28, it is only necessary to use a point where the motion is always in fixed rotational relationship to drum 22.

Shaft 30 of drum 22 is connected by a right angle gearing arrangement 31, said arrangement including drive gear 32 and driven gear 33, and flexible shaft 34 to a pneumatic and/or mechanical rate of penetration sensor 35 such as the rate of penetration sensor disclosed in U.S. Pat. No. 4,419,886, which disclosure is incorporated herein by this reference. Essentially, within the framework of this "mechanical" portion of the present invention, gears 32 and 33 function as gearing arrangement 21 shown in FIG. 2 of U.S. Pat. No. 4,419,886. Use of flexible shaft 34 facilitates initial installation of sensor 35 within the drilling system and it also allows easy repositioning of that sensor. Further, without use of flexible shaft 34, displacement of sensor 35 from a position adjacent to shaft 30 could only be affected by a series of gears, perhaps also including a drive chain and related sprockets. Flexible shaft 34 is much simpler, longer lasting and easy to service than any such multiple gear/drive chain connecting drive means for sensor 35.

The block position sensor 28 of the present invention is also improved over the sensor of U.S. Pat. No. 4,419,886 and other prior art sensors by having incorporated into its gearing arrangement 31 a rotation sensor 36, such as an optical shaft encoder. Rotation sensor 36, shown in FIG. 2 as a drive gear encoder, is so incorporated to provide a signal related to rotation of drumworks drum 22 and thus, because of direct relations discussed further below, to block 12 motion. The signal provided by sensor 36 can usefully be transmitted via an appropriate line 38 to a microcomputer 40, which could be programmed to determine, in part, drilling apparatus 24 position and rate of penetration based upon that signal input.

Several important relationships upon which the present invention is based can be succinctly identified and described. First, there is a direct relationship between feed of cable 16 paid out (or in) from drum 22 and feed of vertical motion of traveling block 12. This relationship can be defined in terms of the ratio NUMBER OF LINES IN THE TRAVELING BLOCK SYSTEM: 1. For example, in FIG. 1, there are two vertical lines in the traveling block system illustrated; hence, for each two feet of cable 16 paid out (or in) from drum 22, traveling block 12 will move down (or up) one foot. If there were 10 vertical lines, ten feet of cable 16 motion from drum 22 would equal one foot of motion of traveling block 12, and so on. Second, there is a direct relationship between the rotation of drum 6 and feet of cable 16 paid out (or in). One revolution of drum 22 equals pi D feet of cable 16 where D is the effective mean diameter of the line wrap. For a given layer of wraps, this relationship is constant. For the next layer of wraps (up or down) the difference in the cable 16 length is pi times the change in effective mean diameter. Change in mean diameter is, of course, a function of cable size and is approximately equal to plus or minus d times the square root of 3 where d is the cable diameter.

Using the signals from sensor 36 and suitable algorithms based upon the above described relationships, information such as drilling apparatus 24 rate of penetration, traveling block 12 speed and traveling block position may be derived. In addition, with data regarding load collected and input by conventional and well-known means, such items as ton-miles (a function of cable travel and load suspended) and load momentum (a function of block speed and load) could also be determined and displayed.

Whereas prior art equipment was calibrated to an average rate to allow a change of wraps on the drum, the present system can be calibrated at multiple points to decrease the averaging error or it can use suitable algorithms to compensate for changes in the wraps.

Figure 3:
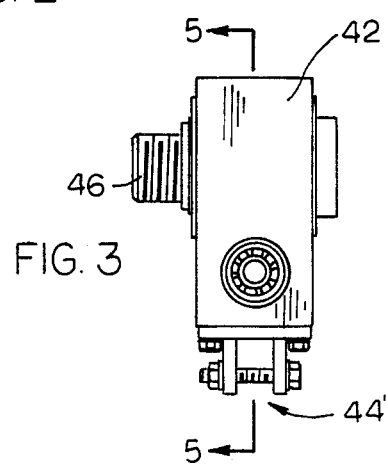
FIG. 3 is a side view of a preferred embodiment of the present invention.
Figure 5:
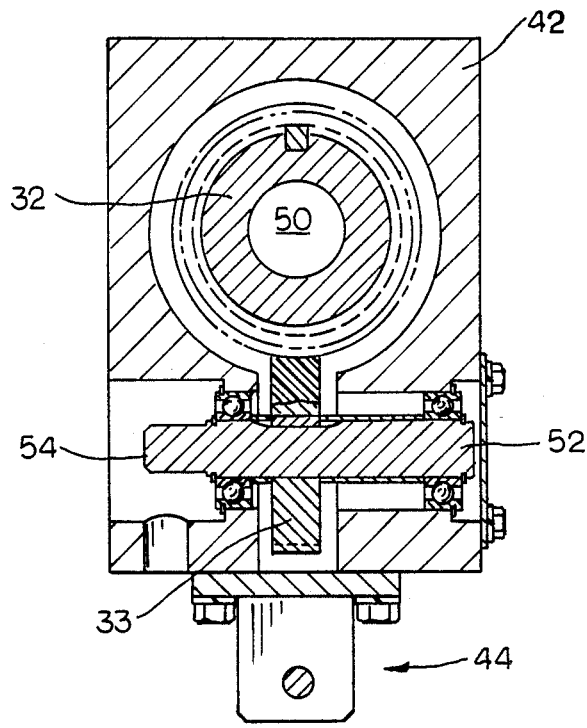
FIG. 5 is a cross-sectional view taken along section line 5—5 of FIG. 3.
Figure 6:
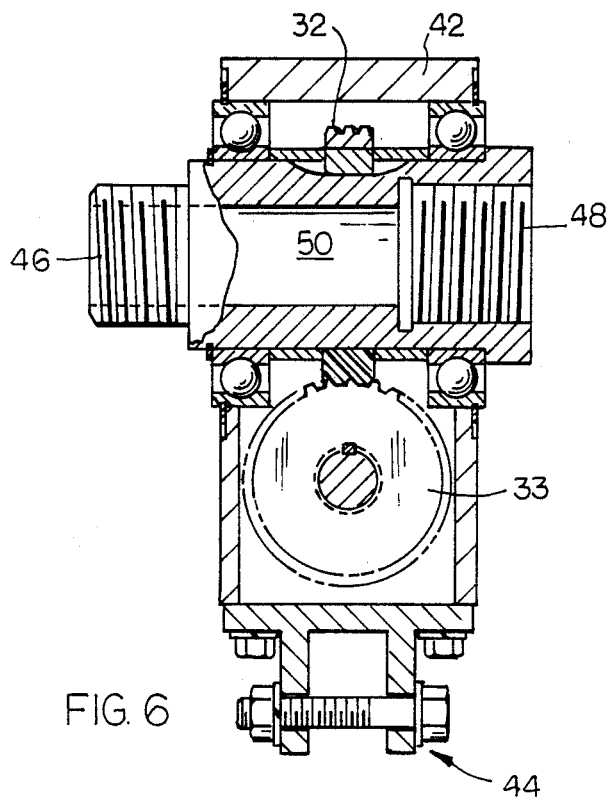
FIG. 6 is a cross-sectional view taken along section line 6—6 of FIG. 4.
Figure 4:
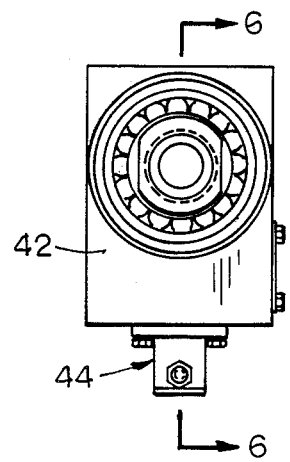
FIG. 4 is a front view of the embodiment shown in FIG. 3.

FIGS. 3 through 8, wherein, as with FIGS. 1 and 2, like reference numerals designate identical or similar elements throughout the several views, show various embodiments of the present invention. Each of the embodiments comprise a housing 42 and a housing mount, generally designated 44, for an antirotation bar (not shown). Within housing 42 are disposed drive gear 32 and driven gear 33. In the embodiments shown in FIGS. 3 through 8, drive gear 32 is connectable to the drawworks drum shaft (not shown in those Figures; shown as element 30 in FIG. 2) via externally threaded shaft 46, which shaft is best seen in FIGS. 3 and 6. Externally threaded shaft 46 is included in the embodiments shown in FIGS. 3 through 8 because typical drawworks shafts are internally threaded on one end. Typical drawworks shafts are also fitted with a rotary air seal to provide an air supply as part of the drawworks brake and clutch system. To facilitate incorporation of the present invention into existing oil drilling systems, housing 42 includes an internally threaded portion 48 which is capable of receiving a conventional rotary air seal, which conventionally is received by the internal threads discussed above as being on one end of a typical drawworks shaft. To further facilitate incorporation of the present invention into existing oil drilling systems, housing 42 has a hollow passage 50 therethrough, which passage extends through internally threaded portion 48, shaft 46, and that portion of the illustrated apparatus therebetween. As the illustrated apparatus include passage 50, the apparatus can be inserted between a convention drawworks drum shaft and a convention rotary air seal without interfering with either of their operations. Finally, all of the embodiments shown in FIGS. 3 through 8 include a shaft 52 which rotates with driven gear 33 and has an end 54 to which a flexible shaft (i.e., flexible shaft 34 shown in FIG. 2) can be suitably connected.

Figure 7:
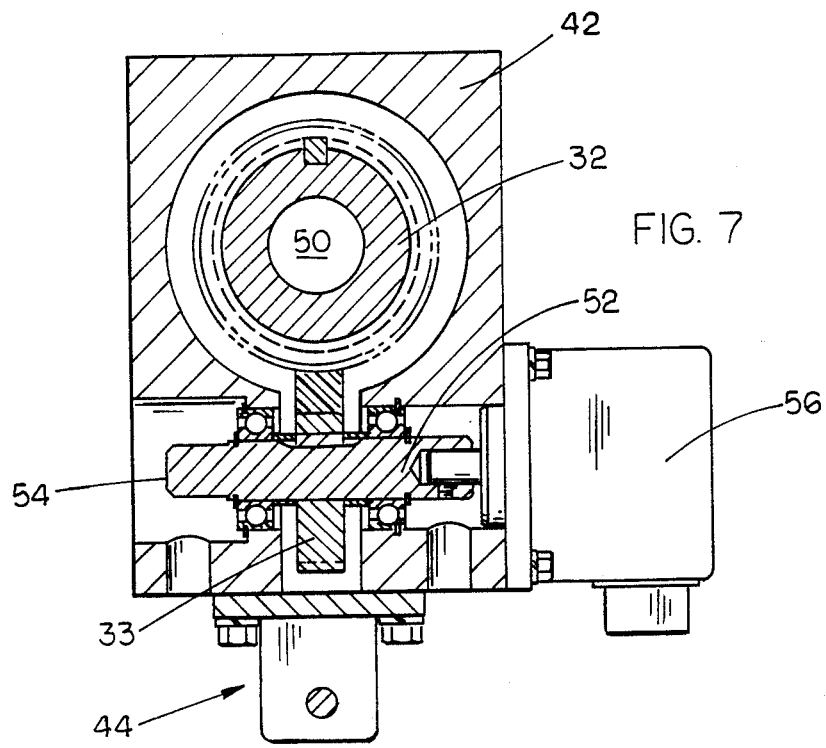
FIG. 7 is a cross-sectional view as in FIG. 5 in which the embodiment is modified so as to include a bolt on type encoder.
Figure 8:
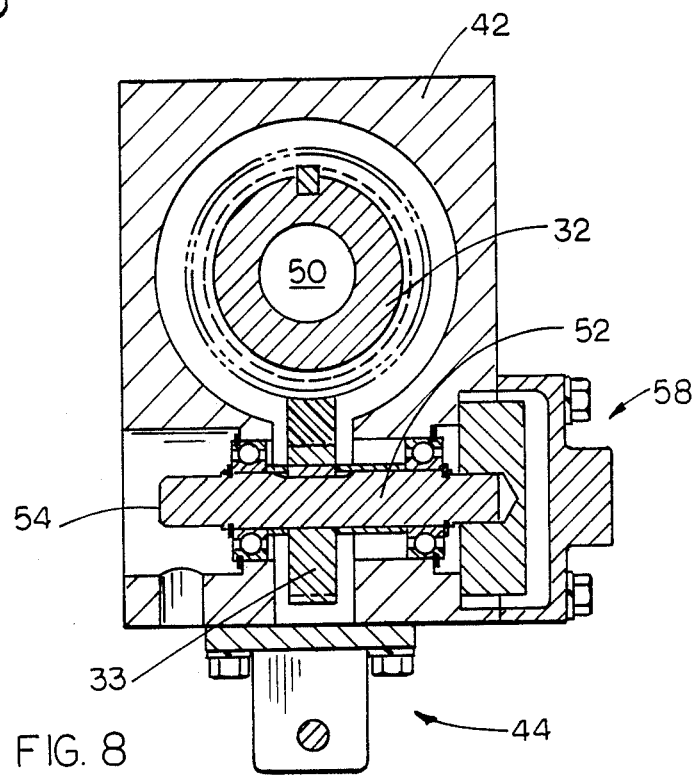
FIG. 8 is a cross-sectional view as in FIG. 5 in which the embodiment is modified so as to include a modular type encoder.

FIGS. 7 and 8 show complete preferred embodiments of the present invention. The apparatus of both FIG. 7 and FIG. 8 include rotation sensors which sense rotation of shaft 52 which rotates in conjunction with driven gear 33. The apparatus of FIG. 7 includes a "bolt-on" type encoder 56 such as a type H25 encoder which is well known to those skilled in the rotation sensor art; the apparatus of FIG. 8 includes a modular type encoder, generally designated 58, such as a BEI model M15 or MCD Model 21 which, like the type H25 encoder, are well known in the relevant art.

From the foregoing description it should be clear that the apparatus of the present invention can be readily incorporated into existing drilling systems. The apparatus of the present invention requires no modification of the drawworks drum or shaft, such as incorporating magnetic markings (pins or tape) or mounting reflective tape or markings to perform its drawworks drum position, speed and direction of rotation sensing functions. Accordingly, recognizing that pins, tapes and markings have limited lives in the harsh oil drilling environment, the apparatus of the present invention, in addition to being easily adaptable to any drawworks, is a much more protected and durable sensing system.

From the foregoing description it should also be clear to those skilled in the art that the apparatus of the present invention could usefully be employed to actuate various mechanisms within the drilling environment upon occurrence of certain events. For example, the apparatus of the present invention could trigger a cable braking mechanism if the traveling block rate of penetration came to exceed a certain, predetermined value.

Regarding calibration of the apparatus of the present invention, the output from encoder 36/56/58 could be fed into microcomputer 40 along with output from a conventional calibration device. A convention and well known calibration device that would be especially suitable for use with (or incorporation into so as to be a component of) the present invention would be any of a number of extension cable linear position transducers available from Raylco Industries, Inc., in which case the calibration device 60 could be temporarily mounted on the drilling rig floor 62 and connected by a cable 64 to the traveling block 12 as shown in FIG. 1. In the calibration mode the outputs from these two devices, that is, the apparatus of the present invention and the calibration device, could be used to create a lookup table relating drawworks drum position to block position as the block is moved through its range of travel. After calibration, the calibration device could be disconnected from the traveling block and removed from the drilling rig floor. The instrumentation would then continue to use the lookup table to determine block movement from the output of the apparatus of the present invention.

Obviously many modifications and variation of this invention are possible in light of the above teachings. It is therefore to be understood that within the scope of the appended claims, the invention may be practiced otherwise than as specifically described.

I claim:

1. An apparatus responsive to the rotation of a drawworks drum for indicating change in position of a traveling block in a drilling rig, said apparatus comprising:
   an adjustable drive unit
   means for providing a first output having a fixed relationship to the rotation of said drum, said means having a rotatable component reflecting said output, said first output capable of driving the adjustable drive unit for providing a second output having an adjustable relationship to the rotation of the drum; and
   sensor means adapted to detect angular rotation of said rotatable component of said means for providing a first output and to provide a signal corresponding to amount of rotation of said rotatable component.

2. The apparatus of claim 1 wherein said means for providing a first output having a fixed relationship to the rotation of the drum comprising a right hand gearing arrangement including a drive gear and a driven gear, the driven gear being mounted on a driven shaft, that driven shaft constituting a rotatable component reflecting said output.

3. The apparatus of claim 2 further comprising a flexible shaft and wherein the driven shaft of the right hand gearing arrangement is adapted to connect to said flexible shaft.

4. The apparatus of claim 3 wherein the sensor means comprises an optical rotation sensor.

5. The apparatus of claim 1 further comprising a microcomputer and means for transmitting the signal to said microcomputer for predetermined processing.

6. The apparatus of claim 5 further comprising calibration means connected to said traveling block and a fixed point in the drilling rig environment comprising:
   means for providing a third output having a fixed relationship to distance between said traveling block and the fixed point in the drilling rig environment throughout the range of movement of said traveling block; and
   wherein said microcomputer is capable of creating a look up table relating drum position to block position throughout the range of block travel from said signal corresponding to amount of rotation of said rotatable component and said third output.

7. In an oil drilling rig, an apparatus for indicating the change in position of a traveling block coupled to a wire line which is wrapped around a drum, said apparatus comprising:
   means for providing a first output having a fixed relationship to the rotation of said drum;
   calibration means for providing a second output having a fixed relationship to distance between said traveling block and a fixed point in the drilling rig environment throughout the range of movement of said traveling block; and
   means for creating a lookup table relating drum position to block position throughout the range of block travel from said first and second outputs.

8. The apparatus of claim 7 further comprising means for determing block position from drum position by use of said lookup table.

9. The apparatus of claim 7 wherein the means for creating a lookup table comprises a microcomputer.

10. The apparatus of claim 7, wherein the calibration means comprises:
    a linear position transducer mounted on the drilling rig floor; and
    a cable connecting said linear position transducer and said traveling block.

* * * * *